July 12, 1960 E. WENNERBO ET AL 2,944,824

TONE ARM LOCKING DEVICE

Filed March 25, 1954

Inventors
ERIK WENNERBO
GÖSTA HEDBERG
by Hill, Sherman, Meroni, Gross & Simpson Attys.

United States Patent Office 2,944,824
Patented July 12, 1960

2,944,824

TONE ARM LOCKING DEVICE

Erik Wennerbo and Gosta Hedberg, Motala, Sweden, assignors to Industriaktiebolaget Luxor, Motala, Sweden, a corporation of Sweden Filed Mar. 25, 1954, Ser. No. 418,591

Claims priority, application Sweden Mar. 30, 1953

3 Claims. (Cl. 274—1)

This invention relates to phonograph apparatus and more particularly to means associated therewith for preventing the tone arm thereof from accidentally moving from its normal rest position outside the periphery of the turntable when the phonograph is not in operation.

It has been frequent practice in the past to temporarily secure the tone arm in place when it is originally shipped from the factory, but after the securing means has once been removed, any subsequent movement of the apparatus may easily result in damage to the tone arm or other parts of the phonograph apparatus due to accidental shifting of the tone arm from its position of rest.

It is furthermore desirable to prevent unintentional displacement of the tone arm at any time due to the fragile nature of the cartridges which are carried in the end of the arm.

One of the principal features and objects of the present invention is to provide a novel method and means of locking the tone arm in place after it has been shifted to its rest position on its support.

It is a further feature and object of the present invention to provide a novel locking member which may be shifted into and out of locking engagement with the tone arm to confine the tone arm in its rest position on its support.

Still another object and feature of the present invention is to provide a locking arrangement for the tone arm of a phonograph which is operatively connected to the control device of the phonograph and/or its drive mechanism in such a manner that it is rendered effective as a locking mechanism when the phonograph is shut off and which is rendered ineffective when the phonograph is turned on.

The novel features which we believe to be characteristic of our invention are set forth with particularity in the appended claims. Our invention itself, however, both as to its organization and manner of construction, together with further objects and advantages thereof, may best be understood by reference to the following description taken in connection with the accompanying drawings, in which:

As shown on the drawing.

Figure 1:
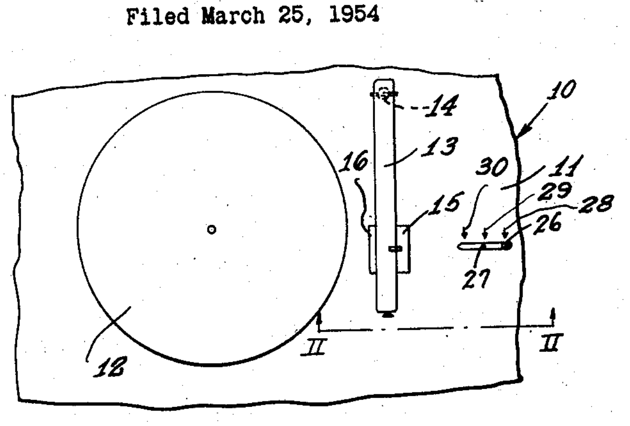
Figure 1 is a top plan view of an automatic phonograph embodying the tone arm locking mechanism of the present invention.

Reference numeral 10 generally designates an automatic phonograph which may comprise a base plate 11 having a turntable 12 rotationally supported thereon. On the base plate 11 is a tone arm 13 supported for pivotal movement about a vertical axis on a shaft 14 indicated in dotted lines.

The tone arm 13 may rest on a support 15 affixed on the base plate 11 which support 15 may have an inner upwardly extending flange 16 forming a stop to prevent inward movement of the tone arm over the turntable. To prevent upward movement of the tone arm 13 and to releasably prevent upward movement thereof, an angular arm 17 has a vertical portion 18 journalled in the support 15 and a transverse horizontal upper end portion 19 arranged to be turned inwardly over the tone arm 13 to prevent upward movement thereof.

The lower end of the vertical portion 18 extends below the base plate 11 and has affixed thereto an arm 20 which carries a downwardly directed pin 21.

Figure 2:
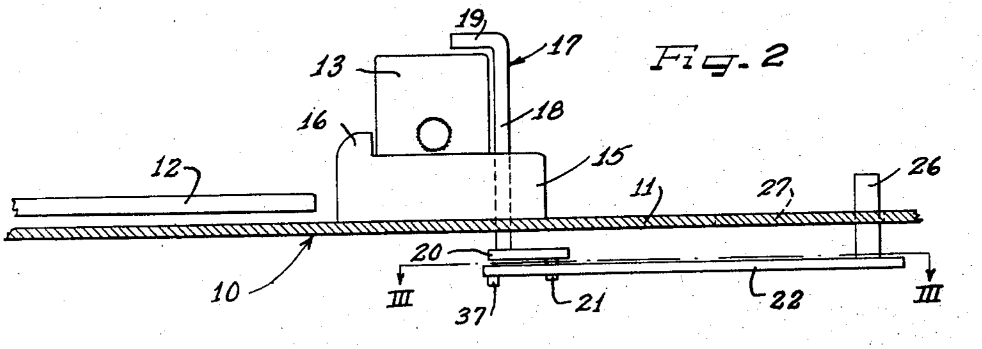
Figure 2 is a sectional view taken substantially along the line II—II of Figure 1.

To actuate the member 17 between the position shown in which the portion 19 thereof prevents upward movement of the tone arm and the position in which the tone arm may be lifted upwardly and moved inwardly over the turntable 12, an elongated plate 22 is supported for movement in the direction of its length toward and away from the turntable 12 and has a cam groove 23 receiving the pin 21. The groove 23 has a portion 24 parallel to the direction of movement of the plate 22 and an active portion 25 angularly related to the portion 24. With the plate 22 in the position illustrated, the pin 21 is at the end of the angular portion 25 of the groove 23 and the upper end portion 19 of the member 17 is in the position illustrated in Figure 2 to limit upper movement of the tone arm 13. The plate 22 may be moved to the left and the pin 21 will be moved to the straight portion 24 of the cam groove 23 so as to pivot the member 17 through approximately 90 degrees and move the upper end portion 19 thereof out of the path of the tone arm 13 to allow the tone arm 13 to be moved inwardly over the turntable.

The plate 22 may be manually actuated as through a pin 26 extending upwardly through a slot 27 in the base plate 11. If desired, the manually actuatable pin 26 may also control other functions of the phonograph. For example, with the pin 26 in the position illustrated in the drawing, the control mechanism of the phonograph may be in an inactive or "stop" condition. In this position, it will be noted that the pin 26 is opposite the arrow 28 on the base plate 11. The pin 26 may be moved to the left opposite the arrow 29 to dispose the mechanism of the phonograph in the "neutral" position and may be moved further to the left opposite the arrow 30 to initiate operation of the automatic phonograph mechanism. The latter position may be termed the "start" position. It will be noted that in both the "neutral" and "start" positions the pin 21 will be in the straight portion 24 of the cam groove 23 so that the upper end portion 19 of the member 17 will be out of the path of the tone arm 13.

In addition to the manual control of the plate 22 through the pin 26, an automatic mechanism may be provided for actuating the same. This mechanism may comprise a cam disk 31 pivotally mounted on a shaft 32 and forming a part of the automatic control mechanism of the photograph. The cam disk 31 has a concentric groove 33 and an eccentric groove 34 leading from one point on the eccentric groove 34, a switch member 35 being pivoted on the cam disk 31 at the junction between the grooves 33 and 34. Both the grooves 33 and 34 extend to a widened recessed area 36 in the base of the cam disk 31. The plate 22 carries a pin 37 normally disposed in the widened portion 36.

Figure 3:
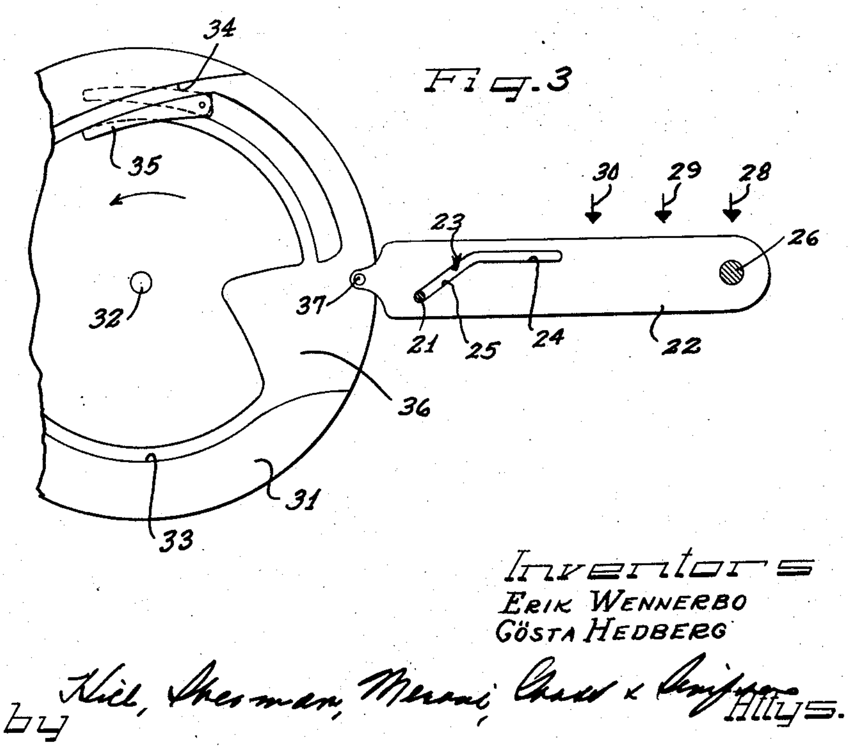
Figure 3 is a sectional view taken along the line III—III of Figure 2.

In operation, the parts may be in the positions illustrated, and operation of the phonograph may be initiated by moving the pin 26 to the "start" position opposite the arrow 30. When the pin 26 is moved to or past the arrow 29 from its "stop" position opposite the arrow 28, means (not shown), which may take any known form, may be provided for moving the switch blade 35 to a position as illustrated in dotted lines in Figure 3. Movement of the pin 26 to the "start" position opposite the arrow 30 will cause rotation of the cam disk 31 in a counterclockwise direction as illustrated in Figure 3 and the pin 37 on the blade 22 will be moved into the concentric groove 33. With the pin 37 in the concentric groove 33, the pin 26 will be in its "neutral" position opposite the arrow 29.

When the cam 31 rotates to a position such that the pin 37 is disposed at the junction between grooves 33 and 34, the pin 37 will continue to move in the concentric groove 33 because the switch blade 35 is in its dotted line position, as previously noted. Accordingly, the upper end portion 19 of the member 17 will be out of the path of the tone arm 13 and the tone arm may be moved upwardly, outwardly from the turntable and then back inwardly over the turntable without interference from the member 17. If desired, of course, automatic record changer mechanism may be provided on the phonograph so that a series of records may be played. The cam disk 31, of course, is rotated only one revolution during each cycle of automatic operation of the phonograph, as is conventional in the prior art.

To stop the phonograph, the pin 26 may be moved back to the "stop" position illustrated opposite the arrow 28. In this operation, means, not shown, may function to move the switch blade 35 from its dotted line position back to the full line position illustrated. This movement of the switch blade 35 could also be accomplished by mechanisms known in the prior art operative after the last record of a stack of records has been played.

When the cam disk 31 is then rotated through one revolution, the pin 37 will ride in the concentric groove 33 until it reaches the junction between the concentric groove 33 and the eccentric groove 34 after which it will move in the eccentric groove 34 because the switch blade 35 is in the full line position as illustrated. The blade 22 will, therefore, be moved outwardly to the position illustrated, in which position the upper end portion 19 of the member 17 will be disposed above the tone arm 13 to prevent displacement thereof from the support 15.

We claim as our invention:

1. In a phonograph, a turntable, a tone arm, means whereby said tone arm is supported for swinging movement between a rest position outside said turntable and a position inwardly over the turntable, locking means for said tone arm, means whereby said locking means are actuatable for locking said tone arm in said rest position, an actuating member for said locking means, means whereby said actuating member is movable between a first position and a second position, means whereby said locking means are effective to lock said tone arm in said rest position when said actuating member is in said first position and are ineffective to lock said tone arm in said rest position when said actuating member is in said second position, operating means for said actuating member, means whereby said operating means is movable through a cycle of movement out of and back to an initial position, first and second control means for said actuating member disposed on said operating means, means whereby said first control means engages said actuating member during an initial portion of said cycle of movement and moves said actuating member to said second position, means whereby said second control means engages said actuating member during a final portion of said cycle of movement and moves said actuating member to said first position, and means whereby said second conrtol means is movable to an inoperative position in which it is inoperative position in which it is inoperative to engage and actuate said actuating member to said first position thereof.

2. In a phonograph, a turntable, a tone arm, means whereby said tone arm is supported for swinging movement between a rest position outside said turntable and a position inwardly over the turntable, locking means for said tone arm, means whereby said locking means are actuatable for locking said tone arm in said rest position, an actuating member for said locking means, means whereby said actuating member is movable between a first position and a second position, means whereby said locking means are effective to lock said tone arm in said rest position when said actuating member is in said first position and are ineffective to lock said tone arm in said rest position when said actuating member is in said second position, operating means for said actuating member, means whereby said operating means is movable through a cycle of movement out of and back to an initial position, first and second control means for said actuating member disposed on said operating means, means whereby said first control means engages said actuating member during an initial portion of said cycle of movement and moves said actuating member to said second position, means whereby said second control means engages said actuating member during a final portion of said cycle of movement and moves said actuating member to said first position, means whereby said second control means is movable to an inoperative position in which it is inoperative to engage and actuate said actuating member to said first position thereof, manually operable means for moving said actuating member between said first and second positions, and means whereby said first and second control means are out of the path of said actuating member when said operating means is in said initial position thereof.

3. In a phonograph, a turntable, a tone arm, means whereby said tone arm is supported for swinging movement between a rest position outside said turntable and a position inwardly over the turntable, locking means for said tone arm, means whereby said locking means are actuatable for locking said tone arm in said rest position, an actuating member for said locking means, means whereby said actuating member is movable between a first position and a second position, means whereby said locking means are effective to lock said tone arm in said rest position when said actuating member is in said first position and are ineffective to lock said tone arm in said rest position when said actuating member is in said second position, operating means for said actuating member, means whereby said operating means is movable through a cycle of movement out of and back to an initial position, a first cam surface on said operating means engageable with said actuating member during an initial portion of said cycle of movement for controlling movement of said actuating member to said second position, a second cam surface on said operating means engageable with said actuating member during a final portion of said cycle of movement for controlling movement of said actuating member from said second position to said first position, and blocking means engageable with said actuating member for preventing movement thereof from said second position to said first position under control of said second cam surface.

References Cited in the file of this patent

UNITED STATES PATENTS

| | | |
|---|---|---|
| 1,554,621 | Boynton | Sept. 22, 1925 |
| 1,610,129 | Goldberg | Dec. 7, 1926 |
| 1,974,070 | Hibbard | Sept. 18, 1934 |
| 2,481,270 | Wennerbo | Sept. 6, 1949 |
| 2,489,146 | Louchheim | Nov. 22, 1949 |
| 2,506,665 | Giovannucci | May 9, 1950 |
| 2,513,555 | Faulkner | July 4, 1950 |
| 2,525,926 | Matthews | Oct. 17, 1950 |
| 2,599,963 | Williams | June 10, 1952 |

FOREIGN PATENTS

| | | |
|---|---|---|
| 494,881 | Great Britain | Nov. 2, 1938 |